June 30, 1931.    G. W. DOOLEY    1,812,516
MEANS FOR PURIFYING WATER
Filed Dec. 21, 1927

WITNESS
Robt. S. Woolsey

INVENTOR
GEORGE W DOOLEY
by James R. Townsend
his atty

Patented June 30, 1931

1,812,516

UNITED STATES PATENT OFFICE

GEORGE W. DOOLEY, OF HUNTINGTON PARK, CALIFORNIA

MEANS FOR PURIFYING WATER

Application filed December 21, 1927. Serial No. 241,663.

This discovery and invention relates more particularly to the separation of water from solids suspended or dissolved therein, and the principal object of the invention is to obtain pure water from muddy water, alkali water, salt water and the like, by the application of heat rays, and more particularly by solar heat rays.

An object of this discovery and invention is to utilize the solar rays to the best advantage in obtaining pure water from muddy water and from water containing solubles such as alkali, calcium chloride, chloride of sodium, magnesia and various salts.

This discovery and invention depends upon the fact that evaporation under heat rays is more rapid when such rays are applied to a tenuous sheet of the liquid supported in a thin sheet of material extended at an angle to such rays, than when such rays are applied directly to the surface of a body of like liquid of considerable depth; and I have discovered that by providing a bibulous sheet having its top and bottom surfaces subjected to the air, and extending at an angle to the direction of the rays, the collection of liquid by condensation of products of evaporation from such sheet is more rapid than when such rays are applied to the surface of a liquid body of substantial depth.

I have discovered that by capillary action, pure water may be separated from a body of water containing solutions or mixtures of solids and that such separation can be effected without clogging the capillary medium.

In carrying out this invention and conducting the method of obtaining pure water from contaminated water, I extend above a confined space below a transparent cover, a bibulous sheet such as a sheet of coarse cotton cloth adapted to readily absorb liquids and having free and unobstructed upper and lower faces exposed to the air, and suspend from such sheet wick means which may be bibulous material of the same or different character as said sheet, and arrange the wicks to extend downward so that their lower ends may dip into a body of the contaminated or impure liquid so as to cause the liquid to saturate the lower ends of said wick means, thereby separating by capillary attraction and conduction, liquid from the solid content of the supply, and causing said liquid to be spread out in a tenuous sheet within the extended absorbent sheet and subject the tenuous and extended sheets to the action of the solar rays passed through the transparent glass pane of the cover, thereby evaporating the liquid and causing it to rise through space above the extended sheet and causing the vapor to be collected in the form of condensate on the cover that confines the space above said sheets.

As means for confining the space above and below the sheet and for holding the water at a suitable level to supply liquid to the lower ends of the wicks, I provide a chamber, the bottom, and the side and end walls of which form a container for the contaminated liquid, and the cover or top of which container is transparent to the solar rays and is adapted to act as a condenser of vapor; and I provide means for collecting from such top the condensate produced from the vapors arising from said sheet, and provide for the discharge of such condensate from the chamber.

I have discovered that by the means above outlined, it is practicable to obtain a larger amount of pure condensate in a given period of time than has heretofore been possible with an equal area of sun exposure.

Other objects, advantages and features of invention may appear from the accompanying drawings, the subjoined detailed description and the appended claims.

The accompanying drawings illustrate the invention.

Figure 1:
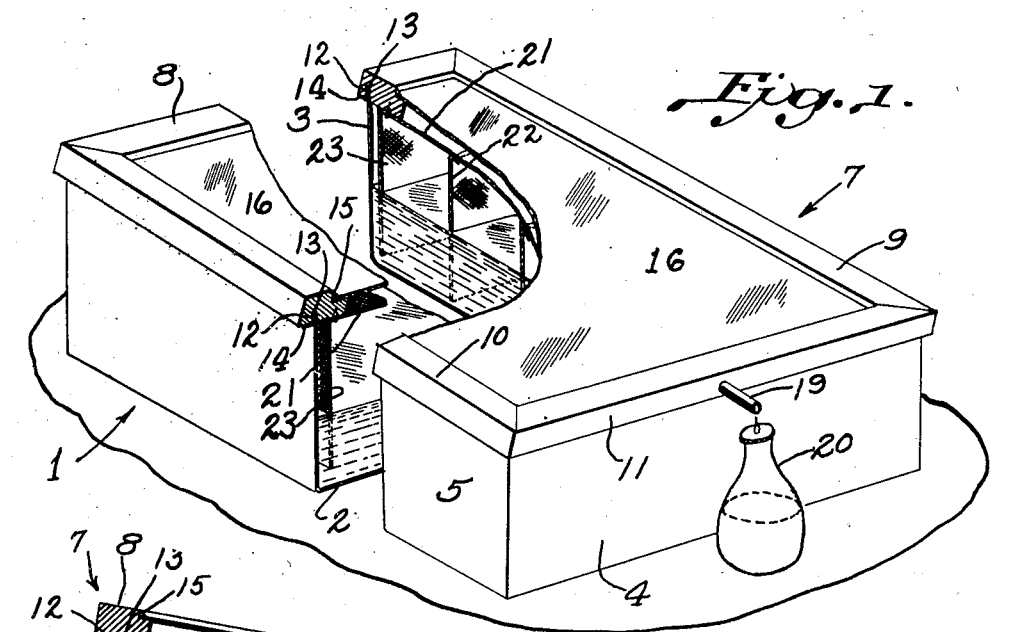
Figure 1 is a perspective view, partly broken away and in section, of a water purifier constructed in accordance with my discovery and invention.
Figure 2:
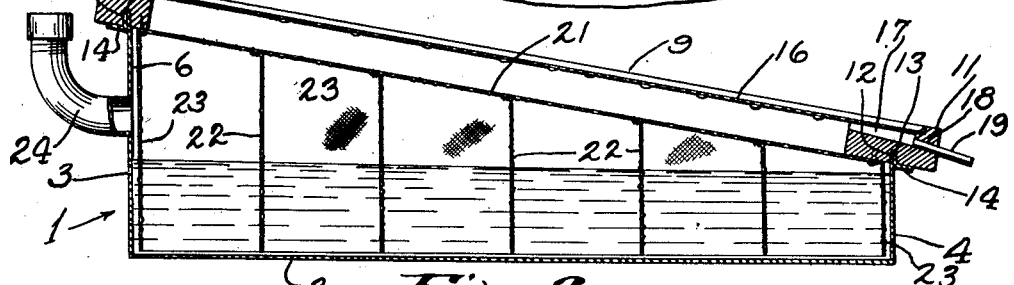
Fig. 2 is a longitudinal sectional elevation of the water purifier shown in Fig. 1.

1 designates the body of my water purifying apparatus which constitutes a container for a body of water and which by preference is constructed of non-corrosive sheet metal and comprises a bottom 2, a rear wall 3, a front wall 4 of lesser height than the rear wall and side walls 5 and 6, which taper from rear to front.

Supported over the container as by being seated on the upper margins of its walls is a frame 7 preferably constructed of wood and which comprises a rear rail 8, side rails 9 and 10 of substantially square section and a front, or lower rail 11 of oblong section. In the bottom face of each rail a channel 12 is formed to receive and embrace the upper margins of the walls of the container and by preference, and as shown, such wall margins or rims are formed as by reverse bending to constitute a reinforcing bead 13 to occupy said channel and to form therewith means for holding the frame against undesirable movement relative to the container. To form a relatively sealed joint or seam between the frame and container, there is formed, as a continuation of the bead, an outwardly extended flange 14 which underlies the lower face of the frame and by reason of its bearing the weight of the frame such proximity of the faces of the flange and frame is established so as to prevent entrance of dust, insects or other water fouling matters.

Formed in the upper faces of the frame rails is a rabbet 15 in which is secured a cover 16 formed of material transparent to heat rays of the sun and by preference is a sheet, or panes, of transparent glass.

On the upper face of the lower rail and inside the rabbet is a sectional reduction forming a collecting trough 17 for the condensate, and formed transversely through the rail leading from the trough is a bore 18 in which a pipe 19, or other fluid conveyor is fixed to conduct the condensate to a suitable vessel such as shown at 20.

Stretched across the frame and secured to the underneath faces of the rails thereof is a sheet, or screen 21 of material such as cotton cloth of relatively coarse weave, which is bibulous or a water absorbent.

Figure 3:
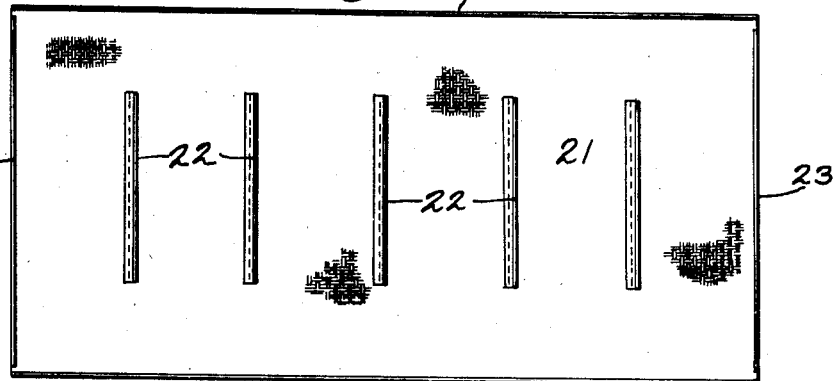
Fig. 3 is a view of the bibulous wick means and sheet, looking upward from the bottom of Fig. 2; omitting the container.

Secured to the sheet to depend therefrom at relatively spaced intervals and for extension, or dipping, into the body of water is a plurality of capillary strips, or wicks 22, which serve to supply the central or interior area of the sheet, while other wicks 23, which by preference and as shown in Fig. 3, are integral marginal extensions of the sheet serve to supply water to the marginal area of the sheet.

Means are provided for supplying water to the container, such as the filling spout, or inlet 24.

In operation the wicks, by capillarity, elevate water from the body in the container, to the sheet, or screen, which absorbs the water and spreads it as a thin film over its entire area. This action is constant and maintains a highly attenuated volume of freshly filtered water drawn from and held physically separated, or spaced from the supply body. By action of radiant heat, as heat from the sun's rays, shining through, or permeating the cover, the thin film or attenuated body of water is rapidly converted to vapor which rises to the cover and is collected and condensed on the underside thereof and the condensate is moved by gravity to the collecting trough and finally to the receiving vessel.

When required, the cover frame 9 with its glass pane and bibulous connections may be removed from the receptacle, and the receptacle may be cleansed from the accumulations of alkali, salt, mud, and other impurities, if any, found therein; and the cover and the bibulous connections may be washed and cleansed if desired, and then the cover and its bibulous connections may be replaced as before and the apparatus is then ready for further use.

I claim:—

1. A solar water purifier comprising a chamber, the lower portion of which constitutes a container for a supply body of water; a sheet of bibulous material positioned in the chamber above the container for the water capillary; means extending downward from the bibulous material for elevating water to the sheet; and a cover above and spaced from the sheet and penetrable by solar rays and serving as a condenser and collector for the condensate.

2. In a solar water purifier the combination of a sheet of bibulous material and capillary means for extension therefrom and for dipping into a supplying body of water, a container for said sheet and capillary means and body of water, said container having a top provided with a sheet of transparent material, and means to collect condensate from the bibulous sheet.

3. A solar water purifier comprising a container for a body of water and an air space; a frame for support over the container; a sheet of material transparent to solar rays secured over the top of the frame; a sheet of bibulous material secured to the frame and spaced from the transparent sheet open to the air on its upper and lower surfaces; capillary means for extension from the bibulous sheet for dipping into a body of water in the container; and means for collecting and delivering the condensate.

4. In a liquid purifier which utilizes the sun's rays for evaporating a liquid, the combination with a container adapted to hold a body of contaminated liquid from which purified liquid is to be obtained; of a bibulous sheet extended in the container above a predetermined level therein; wick means extending from below such level up to and connected to the extended bibulous sheet for the purpose of conducting liquid from such body to the extended sheet for the purpose of forming in such sheet, a tenuous sheet of liquid;

a transparent sheet to admit the sun's rays to produce vapor from such tenuous sheet of liquid means above the bibulous sheet to condense such vapor, and means to collect the condensate.

In testimony whereof, I have hereunto set my hand at Los Angeles, California, this 15th day of December, 1927.

GEORGE W. DOOLEY.